Patented Jan. 10, 1933

1,893,646

UNITED STATES PATENT OFFICE

KARL HOLZACH, OF LUDWIGSHAFEN-ON-THE-RHINE, AND GUIDO von ROSENBERG, OF MANNHEIM, GERMANY, ASSIGNORS TO GENERAL ANILINE WORKS INC., OF NEW YORK, N. Y., A CORPORATION OF DELAWARE

AZO DYESTUFFS AND COMPLEX METAL COMPOUNDS THEREOF

No Drawing. Application filed June 29, 1929, Serial No. 374,939, and in Germany July 30, 1928.

The present invention relates to the production of azo dyestuffs containing a sulphonic group and complex metal compounds thereof comprising a 4-hydroxyquinolone as coupling component.

We have found that valuable azo dyestuffs are obtained by coupling an o-hydroxydiazo compound with a 4-hydroxyquinolone corresponding to the general formula:

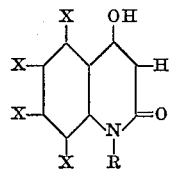

in which R stands for an alkyl, aralkyl or cyclic radicle which may be substituted and X for hydrogen or any substituent, the reacting components being so chosen that the product contains at least one sulphonic group.

The new dyestuffs give dyeings having very good fastness properties on animal fibre treated with a metallic mordant. Similarly by subsequent treatment of dyeings on unmordanted fibre, for example with bichromate, extremely fast dyeings are obtained. Finally the dyestuffs themselves may be readily converted into complex metal compounds, for example chromium or copper compounds, which give direct dyeings having very valuable properties.

The shade of color of the dyestuff obtained may be changed on the one hand by selecting the o-hydroxydiazo compound and on the other hand by the alteration of the quinolone component either in the substituent on the nitrogen atom or the substituent in the benzene nucleus.

The following examples will further illustrate the nature of this invention, but the invention is not restricted to these examples. The parts are by weight.

Example 1

A diazo solution prepared in the usual manner from 22.3 parts of 4-chlor-2-aminophenol-6-sulphonic acid in 200 parts of water is allowed to run at a temperature of about 10° C. into a solution of 23.7 parts of N-phenyl-4-hydroxy-2-quinolone in 330 parts of water, 11.7 parts of 35 per cent caustic soda solution and 60 parts of sodium carbonate and the whole stirred at from 10° to 15° C. until the diazo compound is used up. The dyestuff is then separated after warming the reaction mixture by the addition of salt, filtered off by suction and dried. The dyestuff is a brown violet powder which dissolves in water to give a violet coloration which changes to orange when acidified.

Bordeaux red dyeings are obtained on chromium mordanted wool, and the same shade is obtained by after chroming the orange dyeings obtained on unmordanted wool.

The dyestuff obtainable according to the above example is converted into its complex chromium compound by heating it for 2 hours at about 125° C. in 600 parts of water with a solution of chromium oxide hydrate corresponding to 20 parts of chromium oxide in 130 parts of a 30 per cent aqueous solution of formic acid. After cooling the dyestuff is separated by salting out. The complex chromium compound dissolves to give a red coloration, and dyes unmordanted wool a very fast bluish red.

Example 2

A diazo solution prepared in the usual manner from 2.3 parts of 4-nitro-2-aminophenol-6-sulphonic acid in 20 parts of water is caused to flow at about 10° C. into a solution of 1.9 parts of N-ethyl-4-hydroxy-2-quinolone (of melting point 265° C., and prepared by boiling N-ethyl anthranilic acid with acetic acid anhydride) in 25 parts of water, 1.17 parts of 35 per cent caustic soda solution and 6 parts of sodium carbonate and the whole stirred at from 10° to 15° C. until the diazo compound can no longer be detected. The dyestuff is then filtered off by suction and dried. It is obtained as a red brown powder having a green sheen which dissolves in water to give a red coloration which when acidified changes to orange. The dyeings on unmordanted wool are bluish red, and by after chroming are converted into a somewhat yellowish red having excellent fastness properties.

*Example 3*

A diazo solution prepared in the usual manner from 20 parts of picramic acid is allowed to run at from 10° to 15° C. while stirring into a solution of 25.5 parts of Bz-sulphonic-N-methyl-4-hydroxy-2-quinolone (prepared by a short treatment of N-methyl-4-hydroxy-2-quinolone with 23 per cent oleum) in 200 parts of water to which 25 parts of sodium carbonate have been added. When the formation of the dyestuff is complete it is separated by weak acidification and salting out with potassium chloride, filtered off by suction and dried. It is then a dark brown powder which dissolves in water, dilute acids or dilute alkalies to give a brown coloration and which gives a brown dyeing on wool which is converted into a very fast red brown by after chroming.

*Example 4*

A diazo solution prepared in the usual manner from 25 parts of naphthalene-1-amino-2-hydroxy-4-sulphonic acid is introduced while stirring at from 10° to 20° C. into a solution of 17.5 parts of N-methyl-4-hydroxy-2-quinolone in 150 parts of 20 per cent caustic soda solution. After completion of the formation of the dyestuff, the mixture is acidified with mineral acid and the dyestuff filtered off by suction. When dried it is a brown powder which disoslves in water with an orange coloration. By the addition of sodium carbonate the coloration is changed to violet. Wool is dyed in red brown shades which become very fast violet shades by after chroming.

*Example 5*

A diazo solution prepared in the usual manner from 22.3 parts of 4-chlor-2-aminophenol-6-sulphonic acid in 200 parts of water is run at about 10° C. into a solution of 27 parts of N-(2'-methoxyphenyl)-4-hydroxy-2-quinolone (obtainable by heating to boiling for 1 hour N-(2'-methoxyphenyl)-anthranilic acid with 2½ times the amount of acetic acid anhydride), 11.7 parts of a 35 per cent caustic soda solution and 60 parts of soda in 330 parts of water and the reaction mixture is stirred at between 10° and 15° C. until the diazo compound is used up. By the addition of 10 per cent of sodium chloride the dyestuff is separated. It forms a red brown powder when dried from which Bordeaux red dyeings are obtained on chromium mordanted wool. The same shades are obtained by after chroming the dyeings on unmordanted wool.

The complex chromium compound of the above described dyestuff can be produced by making it into a paste with about 700 parts of water and heating the paste at 120° C. for 3 hours in an autoclave with a solution of chromium oxide hydrate corresponding to 22 parts of chromium oxide in 150 parts of a 30 per cent formic acid. By the addition of an equal volume of a 25 per cent aqueous solution of sodium chloride the dyestuff is precipitated from the cooled reaction mixture. The complex chromium dyestuff dyes wool red shades with bluish tinge of very good fastness properties. The complex chromium compound can also be produced by means of other chromium salts.

What we claim is:—

1. As new articles of manufacture complex metal compounds of the dyestuffs derived from coupling an o-hydroxy diazo compound and a 4-hydroxyquinolone of the general formula:

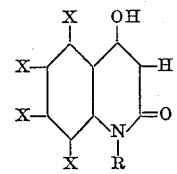

in which R stands for an alkyl radicle or a radicle of the benzene series and X for hydrogen or a sulphonic acid group, the reacting components being so chosen that the product contains at least one sulphonic acid group.

2. As new articles of manufacture complex chromium compounds of the dyestuffs derived from coupling an o-hydroxy diazo compound and a 4-hydroxy quinolone of the general formula:

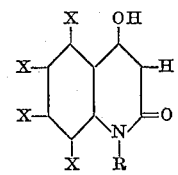

in which R stands for an alkyl radicle or a radicle of the benzene series and X for hydrogen or a sulphonic acid group, the reacting components being so chosen that the product contains at least one sulphonic acid group.

3. As a new article of manufacture the complex chromium compound of the o-hydroxy azo dyestuff corresponding to the formula:

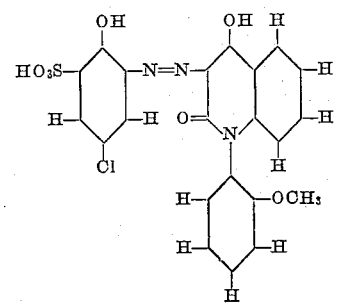

dyeing wool very fast red shades with bluish tinge.
4. As a new article of manufacture the complex chromium compound of the o-hydroxyazo dyestuff corresponding to the formula:
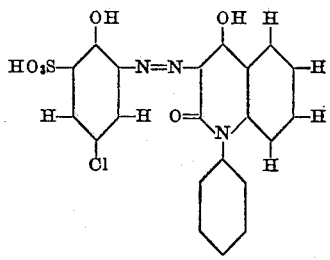
dissolving in water to give a red coloration and dyeing wool very fast bluish red shades.
In testimony whereof we have hereunto set our hands.
KARL HOLZACH.
GUIDO von ROSENBERG.